(12) United States Patent
Goldswain

(10) Patent No.: US 6,905,123 B2
(45) Date of Patent: Jun. 14, 2005

(54) SEALS

(75) Inventor: Ian Martyn Goldswain, Slough (GB)

(73) Assignee: John Crane UK Limited, Slough (GB)

( * ) Notice: Subject to any disclaimer, the term of this patent is extended or adjusted under 35 U.S.C. 154(b) by 0 days.

(21) Appl. No.: 10/357,272

(22) Filed: Jan. 31, 2003

(65) Prior Publication Data

US 2003/0146577 A1 Aug. 7, 2003

(30) Foreign Application Priority Data

Feb. 2, 2002 (GB) .............................. 0202468

(51) Int. Cl.$^7$ ................................ F16J 9/00
(52) U.S. Cl. ................... 277/345; 277/346; 277/347; 277/350; 277/399; 277/408
(58) Field of Search ................ 277/345, 346, 277/347, 350, 408, 399

(56) References Cited

U.S. PATENT DOCUMENTS

| 2,128,744 | A | * | 8/1938 | Hornschuch | 277/387 |
|---|---|---|---|---|---|
| 2,531,079 | A | * | 11/1950 | Payne | 277/369 |
| 2,984,507 | A | * | 5/1961 | Welch | 277/408 |
| 3,589,738 | A | * | 6/1971 | Tracy | 277/397 |
| 3,632,117 | A | * | 1/1972 | Villasor | 277/388 |
| 3,751,045 | A | * | 8/1973 | Lindeboom | 277/400 |
| 3,994,503 | A | * | 11/1976 | Dousse et al. | 277/347 |
| 4,183,540 | A | * | 1/1980 | Hytonen | 277/388 |
| 4,212,475 | A | * | 7/1980 | Sedy | 277/400 |
| 4,395,048 | A | * | 7/1983 | Timmermans et al. | 277/387 |
| 4,406,466 | A | * | 9/1983 | Geary, Jr. | 277/400 |
| 4,768,790 | A | * | 9/1988 | Netzel et al. | 277/377 |
| 4,993,917 | A | * | 2/1991 | Kulle et al. | 415/105 |
| 5,039,113 | A | * | 8/1991 | Gardner | 277/379 |
| 5,058,905 | A | * | 10/1991 | Nosowicz et al. | 277/365 |
| 5,066,026 | A | * | 11/1991 | Heck et al. | 277/400 |
| 5,137,284 | A | * | 8/1992 | Holder | 277/390 |
| 5,141,389 | A | * | 8/1992 | Bear et al. | 415/30 |
| 5,158,431 | A | * | 10/1992 | Schellong et al. | 277/369 |
| 5,180,173 | A | * | 1/1993 | Kimura et al. | 277/400 |
| 5,224,714 | A | * | 7/1993 | Kimura et al. | 277/400 |
| 5,275,421 | A | * | 1/1994 | Hornsby | 277/370 |
| 5,421,593 | A | * | 6/1995 | Aritsubo et al. | 277/361 |
| 5,443,274 | A | * | 8/1995 | Fuse | 277/390 |
| 5,664,789 | A | * | 9/1997 | Hayashi | 277/345 |
| 5,700,013 | A | * | 12/1997 | Baty | 277/340 |
| 5,823,539 | A | * | 10/1998 | Rockwood | 277/390 |
| 5,899,460 | A | * | 5/1999 | Altieri | 277/352 |
| 6,142,478 | A | * | 11/2000 | Pecht et al. | 277/400 |
| 6,347,800 | B1 | * | 2/2002 | Auber | 277/347 |
| 6,425,583 | B1 | * | 7/2002 | Muraki | 277/358 |
| 6,431,551 | B1 | * | 8/2002 | Fuse et al. | 277/390 |
| 6,494,458 | B2 | * | 12/2002 | Uth | 277/358 |
| 6,517,077 | B1 | * | 2/2003 | Enomura | 277/358 |
| 6,524,059 | B1 | * | 2/2003 | Nogiwa | 415/26 |
| 6,565,095 | B2 | * | 5/2003 | Meacham | 277/408 |
| 6,655,693 | B2 | * | 12/2003 | Hosanna et al. | 277/358 |
| 2003/0015842 | A1 | * | 1/2003 | Wilhelm | 277/390 |

FOREIGN PATENT DOCUMENTS

| DE | 38 43 288 A1 | 6/1990 | G02F/1/133 |
|---|---|---|---|
| EP | 0499370 | 8/1992 | |
| EP | 0578377 | 1/1994 | |
| FR | 2 563 583 | 10/1985 | |
| GB | 1 309 865 | 3/1973 | |
| GB | 1 497 257 | 1/1978 | |
| GB | 2 167 141 A | 5/1986 | F16J/15/42 |
| WO | 96/15397 | 5/1996 | F16J/15/34 |

* cited by examiner

Primary Examiner—Daniel P. Stodola
Assistant Examiner—Carlos Lugo
(74) Attorney, Agent, or Firm—Davis & Bujold, P.L.L.C.

(57) ABSTRACT

A gas seal for providing a seal between a pair of relatively rotatable components is provided with a stand-still seal which will seal between the components when the components are stationary, the stand-still seal having a sealing element mounted in sealing relationship with respect to one of said components and being displaceable into sealing engagement with the other component when the components are stationary with respect to one another.

19 Claims, 4 Drawing Sheets

SEALS

FIELD OF THE INVENTION

The present invention relates to seals and in particular to improvements in and relating to gas seals.

BACKGROUND OF THE INVENTION

With gas seals of, for example, the type disclosed in EP 0,499,370 and EP 0,578,377, the disclosures of which are incorporated herein by reference thereto, groove areas are provided in one of a pair of opposing sealing faces whereby, upon rotation of one of the sealing faces relative to the other, a cushion of product gas is built up between the sealing faces to lubricate and create a seal between the sealing faces. When such seals are not rotating, they rely on engagement between the sealing faces to provide a static seal. Even though the grooved sealing face will normally have a continuous circumferential dam formation which will engage the other sealing face, gas seals of this type are subject to leakage under static conditions. When used in high pressure applications, for example on gas compressors, the expansion of the gas as it leaks across the gas seal will cause cooling of the gas which may even lead to liquefaction of the gas. The presence of liquefied gas in the gas seal is detrimental to the efficient operation of the gas seal under dynamic conditions. In order to address this problem auxiliary compressors have hitherto been used to pass warm gas through the gas seal. A further problem with leakage under static conditions is that the leaking gas must be vented or flared to atmosphere, with the consequent adverse affect on the environment.

SUMMARY OF THE INVENTION

According to one aspect of the present invention, a gas seal for providing a seal between a pair of relatively rotatable components comprises a first seal face member mounted in rotationally fixed relationship and sealed with respect to one of said components and a second seal face member mounted in rotationally fixed relationship and sealed with respect to the other component, the first and second seal face members being urged towards one another by spring means, grooves being provided in one of said first and second seal face members to create a hydrodynamic force opposing the load applied by the spring means, when one seal face member rotates relative to the other, and a stand-still seal acting between the relatively rotatable components, the stand-still seal comprising a sealing element mounted in sealing relationship with respect to one of said components and being displaceable into sealing engagement with the other component when the components are stationary with respect to one another.

In accordance with the present invention, when the components are rotating relative to one another the stand-still seal will be retracted and the seal will be provided between the components by means of the gas seal, in conventional manner. However, when the components are stationary relative to one another, the stand-still seal is moved into sealing engagement with the other component, thereby providing a static seal between the components. The pressure across the gas seal may then be equalised thereby preventing leakage and cooling of the process gas.

According to a preferred embodiment of the invention the stand-still seal comprises an annular piston which is slidably mounted in a housing coaxially of a rotating component, the piston being displaceable axially into sealing engagement with a radial face of a component mounted for rotation with the other component. The piston may be moved between a retracted and engaged position by hydraulic, pneumatic or electrical means.

BRIEF DESCRIPTION OF THE DRAWINGS

An embodiment of the invention is now described, by way of example only, with reference to the accompanying drawings in which.

DETAILED DESCRIPTION OF THE INVENTION

Figure 1:
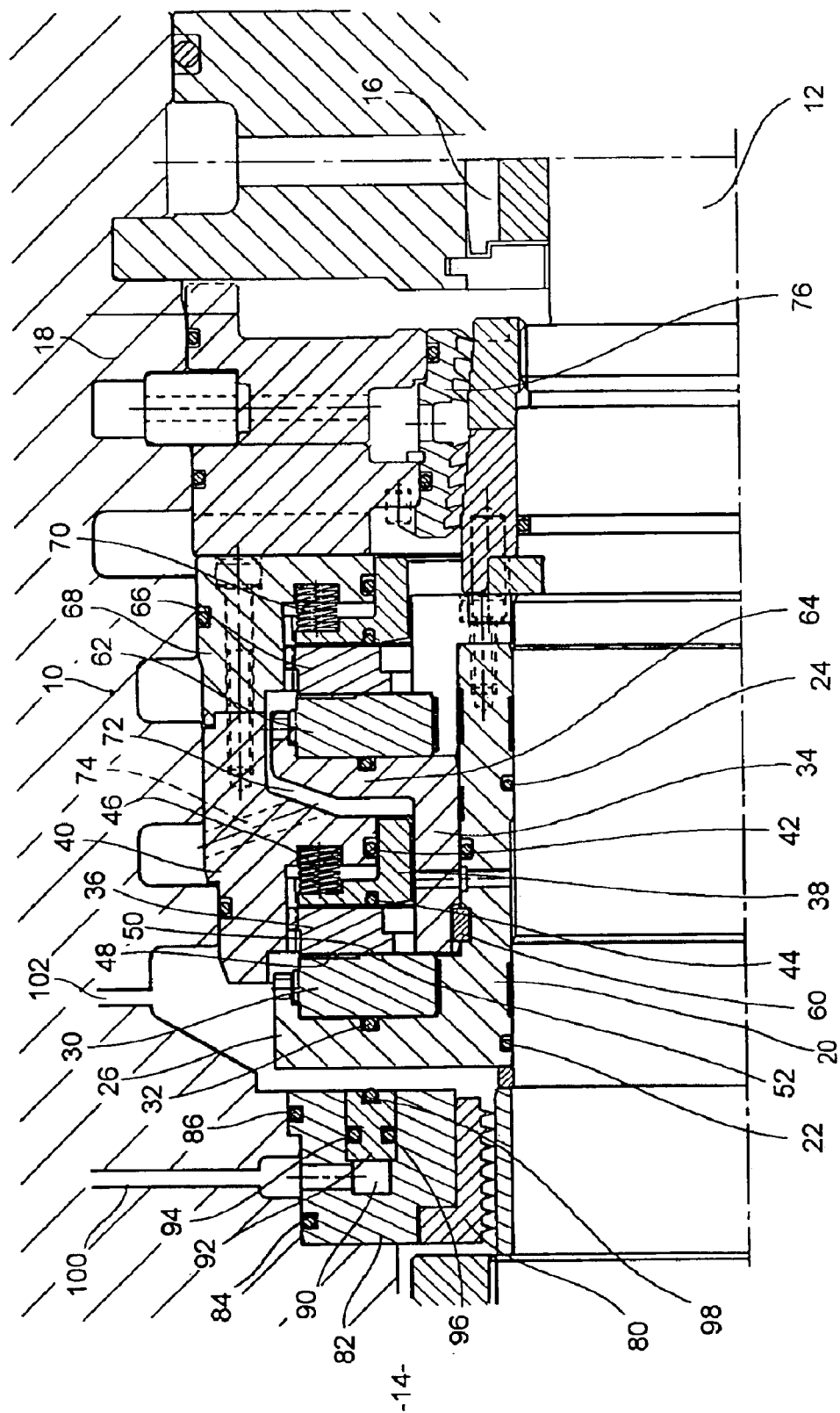
FIG. 1 illustrates a seal in accordance with the present invention.
Figure 2:
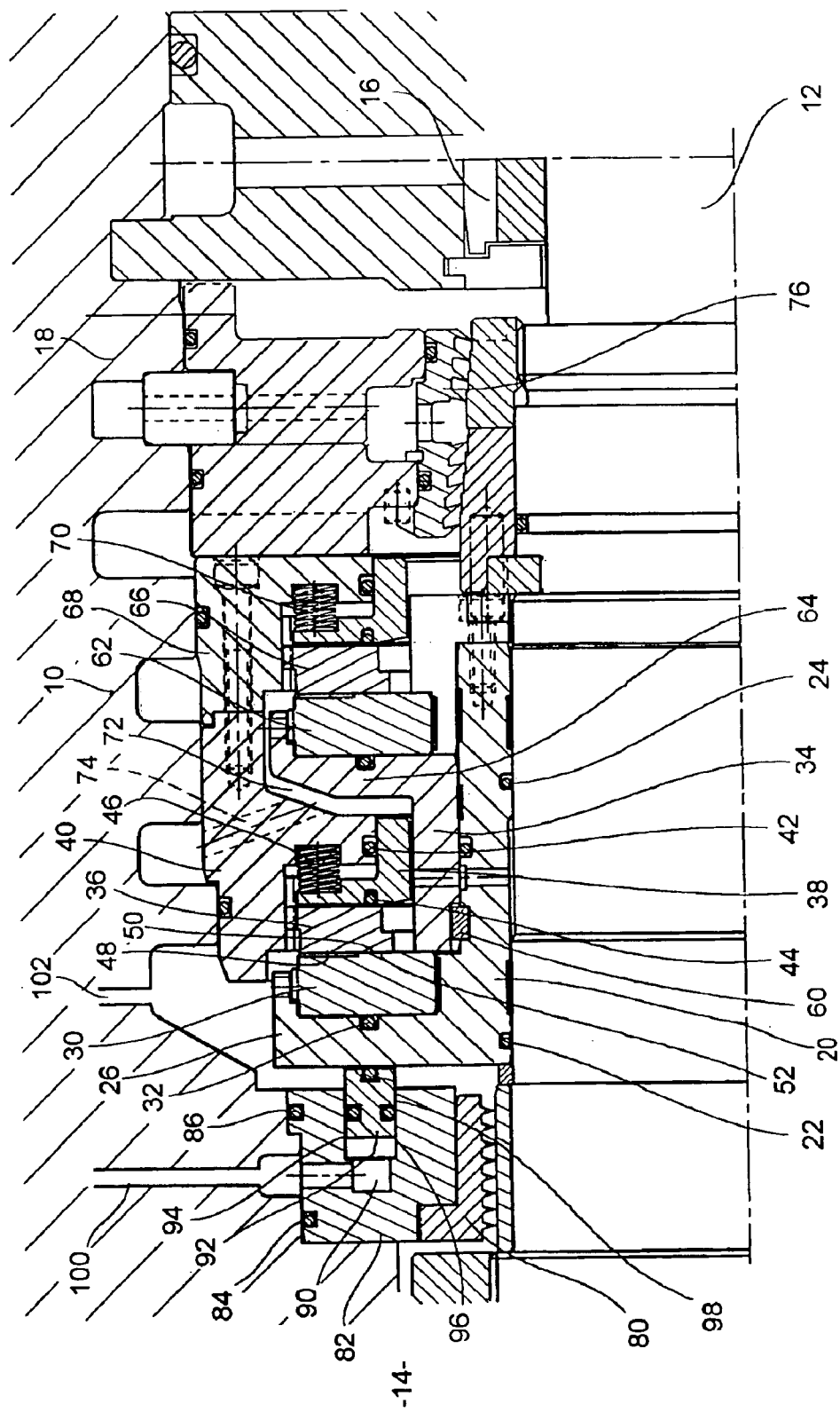
FIG. 2 illustrates the seal shown in FIG. 1, with a stand-still seal in a deployed position.

FIG. 1 illustrates the seal assembly 10 for the shaft 12 of a gas compressor, the seal assembly 10 providing the seal between the compressor chamber 14 and a shaft bearing 16.

The seal assembly 10 is mounted in a bore defined by a housing 18 coaxial of the shaft 12. A sleeve member 20 is secured to the shaft 12 for rotation therewith and sealed with respect thereto by means of sealing elements 22 and 24. A flange formation 26 extends radially outwardly of the sleeve member 20 at the end thereof adjacent the compressor chamber 14.

A first seal face member 30 is mounted on the face of flange formation 26 remote from the compressor chamber 14, for rotation therewith. The first seal face member is sealed to the flange formation 26 by means of sealing element 32. An annular member 34 is mounted on the external diameter of the sleeve member 20, the annular member 34 abutting the seal face member 30 to locate it axially.

A second seal face member 36 is mounted on a carrier ring 38 which is slidably located between annular member 34 and an annular member 40 secured to the housing 18. The carrier ring 38 is sealed with respect to annular member 40 by means of sealing element 42 and to the second seal face member 36 by sealing element 44. A plurality of annular spaced compression springs 46 act between annular member 40 and the carrier ring 38, to urge the second seal face member 36 towards the first seal face member 30.

A grooved area 48 is provided in the outer portion of a sealing face 50 of the first seal face member 30, so that upon rotation of the shaft 12, processed gas will be pumped between the faces 50 and 52 of the first and second seal face members 30 and 36, to generate a load which opposes that applied by the springs 46 and creates a gas cushion which will lubricate the sealing faces and provide a seal.

A key formation 60 acts between the annular member 34 and sleeve member 20 to transmit torque therebetween. A third seal face member 62 is mounted in similar manner to the first seal member 30 to a flange formation 64, formed at the end of annular member 34 remote from the compressor chamber 14. A fourth seal face member 66 is mounted in similar manner to the second seal face member 36 and is sealed with respect to an annular member 68 secured to the housing 18. The fourth seal face member 66 is urged towards the third seal face member 62 by means of a plurality of angularly spaced compression springs 70. The first and second and third and fourth seal face members thereby constitute a pair of gas seal assemblies spaced axially of one another and defining a sealed chamber 72 therebetween. A passageway 74 from the chamber 72 allows product gas leaking passed the first gas seal assembly 30/36 to be removed from the chamber 72, the leaking gas being vented or flared to atmosphere; recycled or mixed with fuel gas powering the compressor.

A labyrinth seal assembly 76 is provided outboard of the gas seal assembly 62/66 to prevent lubricant from the bearing 16 from reaching the gas seal assembly 62/66. Alternatively a carbon ring contacting seal can be used in this location.

A labyrinth seal 80 is mounted between the first seal face member 30 and the compressor chamber 14 on an annular member 82 which is secured to the housing 18 and sealed with respect thereto by means of sealing elements 84 and 86. The annular member 82 defines a closed annular cylinder 90 which extends coaxially of the shaft 12 and opens to the radial face of annular member 82 remote from the compressor chamber 14. An annular piston 92 is located in the cylinder 90, the piston 92 being sealed with respect to the inner and outer walls of the cylinder 90 by means of sealing elements 94 and 96. An annular sealing element 98 is also provided in the outer end of the piston 92.

The cylinder 90 is connected to a source of gas under pressure, for example an accumulator 110 by means of passageway 100, whereby pressure a may be applied to the piston 92 forcing it axially out of cylinder 90, so that the sealing element 98 is forced into sealing engagement with the surface of flange formation 26 adjacent the compressor chamber 14, thereby isolating the gas seal assembly 30/36 from the compressor chamber 14.

Figure 3:
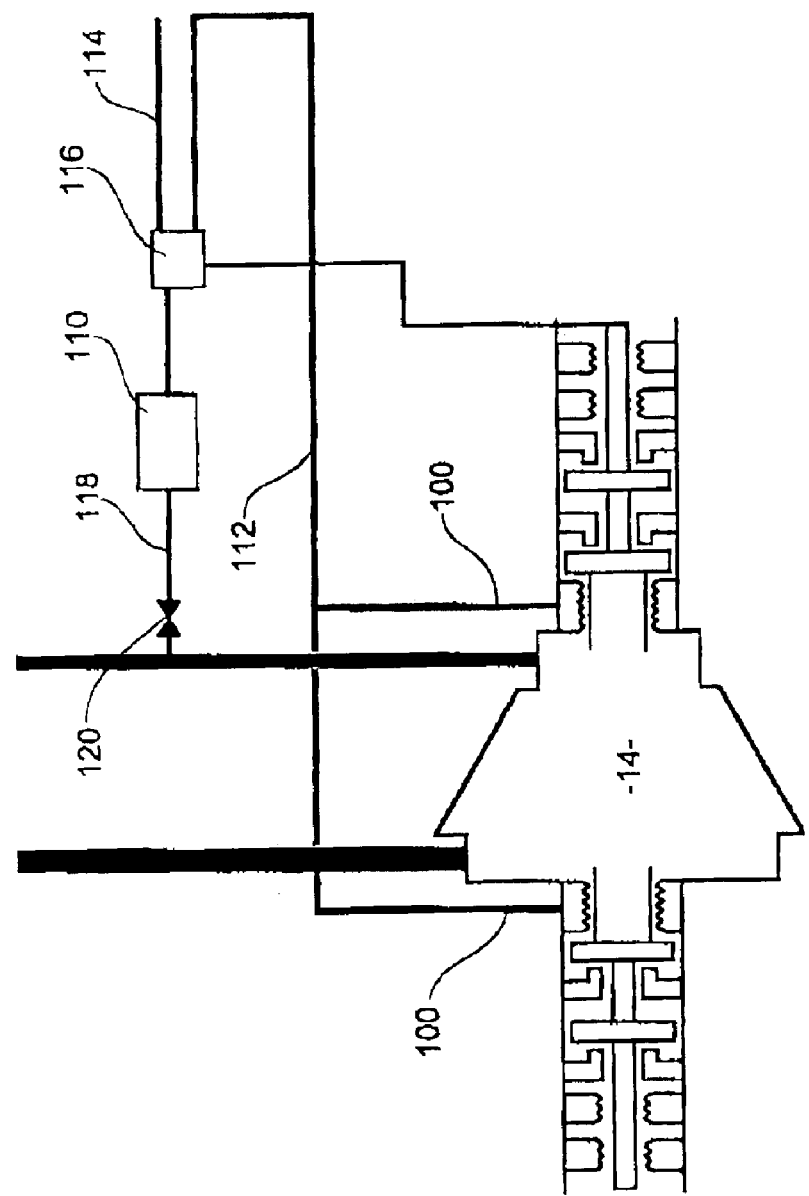
FIG. 3 illustrates a gas compressor with stand still seals on either side of the compressor chamber.
Figure 4:
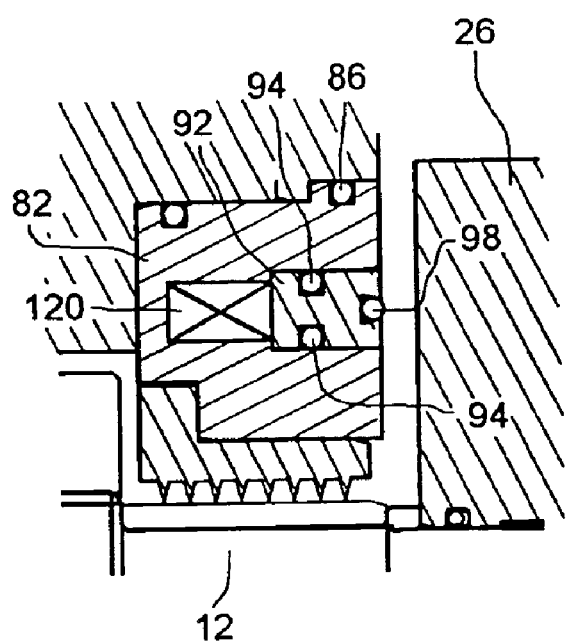
FIG. 4 shows a partial view of another embodiment of the seal shown in FIGS. 1 and 2.

As illustrated in FIG. 3, stand-still seals as described above are provided on both sides of the compressor chamber 14. Gas under pressure is selectively delivered to the cylinder 90 from an accumulator 110 via line 112, or vented from the cylinder 90 via link 114, by means of an electronically controlled change-over valve 116. The electronically controlled change-over valve 116 has an electronic interlock preventing connection of the cylinder 90 to the accumulator 110 when the shaft 12 is rotating. The accumulator 110 is charged with process gas from the discharge side of the compressor, via line 118 and non-return valve 120.

With the seal assembly described above, under normal operation when shaft 12 is rotating, no pressure is applied to cylinder 90 and consequently the pressure of the product gas acting on the free end of piston 92 will force it away from flange formation 26, so that the sealing element 98 is clear of the rotating face of flange 26. The gas seal assemblies 30/36 and 62/66 operate in conventional manner to provide a seal, any gas leaking across the gas seal assembly 30/36 being removed from chamber 72 via passageway 74.

When shaft 12 is stationary, fluid under pressure is applied to the piston 92 forcing it into engagement with the adjacent face of flange formation 26 thereby isolating the gas seal assembly 30/36 from the product gas in compression chamber 14. The gas between the piston 92 and gas seal assembly 30/36 may then be vented, via a passageway 102, to remove the pressure differential across the gas seal 30/36 and thereby prevent any leakage across the gas seal 30/36 and cooling of the product gas upon expansion.

To restart the compressor, the chamber between the piston 92 and gas seal assembly 30/36 is first re-pressurised via passageway 102. The hydraulic pressure in cylinder 90 is then vented so that the piston retracts under the pressure of process gas in the compressor chamber 14 and the compressor can then be started in the normal way, thereby preventing wear on the sealing element 98.

The various sealing elements 32,24,32,42,44,62,84,86,94, 96 and 98 have been illustrated as elastomeric O-rings. Other forms of sealing element, for example spring energised polymer seals, may however be used, particularly for the seals 94,96 and 98 on the piston 92.

While in the above embodiment process gas is used to control the stand-still seal, an alternative supply of gas may be used, either from a pressurised source of by means of a compressor. Alternatively, a source of hydraulic fluid under pressure may be used.

In an alternative embodiment, movement of piston 92 between its retracted and deployed positions may be controlled by electromagnetic means, for example an electrical solenoid 120. Preferably the solenoid when energised will hold the piston 92 in the retracted position, the piston 92 being biased to the deployed position so that when the compressor stops the solenoid is de-energized so that the piston 92 moves into engagement with flange 26 to form a seal.

While the invention has been described by way of example, with reference to a double gas seal, it may equally well be used in a single gas seal. Moreover, the standstill seal may be provided on the outboard side of the seal rather than inboard, the chamber formed between the gas seal and the stand-still seal being pressurised to balance the pressure across the gas seal and prevent leakage thereacross.

What is claimed is:

1. A gas seal for providing a seal between a first and a second relatively rotatable components comprising:

a first seal face member mounted in rotationally fixed relationship and sealed with respect to the first component and a second seal face member mounted in rotationally fixed relationship and sealed with respect to the second component;

the first and second seal face members being urged towards one another by a spring mechanism, grooves being provided in one of the first and second seal face members to create a hydrodynamic force opposing the load applied by the spring mechanism when one seal face member rotates relative to the other, and a stand-still seal acting to control a gas flow past the first and second relative rotatable components, the stand-still seal comprising a sealing element in sealing relationship with respect to the second component and being displaceable into direct sealing engagement with the first component when the first and the second components are stationary with respect to one another.

2. The gas seal according to claim 1, in which the stand-still seal comprises an annular piston slidably mounted in a cylinder defined by a portion of an annular member of the seal assembly, the piston being displaceable axially into sealing engagement with a radial face portion of the first component.

3. The gas seal according to claim 2, in which a sealing element is provided on the face of the piston which engages the radial face portion of the first component.

4. The gas seal according to claim 2, in which the radial face portion of the first component is defined by a carrier for a seal face member associated with the first component.

5. The gas seal according to claim 1, in which a stand-still seal is provided inboard of the gas seal, a mechanism being provided to vent a space between the stand-still seal and gas seal, when the stand-still seal sealingly engages the first component.

6. The gas seal according to claim 1, in which the stand-still seal is located outboard of the gas seal, a mechanism being provided to supply gas under pressure to the space between the gas seal and stand-still seal when the stand-still seal sealingly engages the first component.

7. The gas seal according to claim 1, in which the deployment of the gas seal is controlled by a mechanism of gas or hydraulic fluid under pressure, supply of gas or hydraulic fluid to the stand-still seal and venting of gas or hydraulic fluid from the stand-still seal being controlled by an electronically controlled change-over valve.

8. The gas seal according to claim 7, in which an electronic interlock is provided to prevent supply of gas or hydraulic fluid under pressure to the stand-still seal, when the first and second components are rotating relative to one another.

9. The gas seal according to claim 1, in which deployment of the stand-still seal is controlled by electromagnetic mechanism.

10. The gas seal according to claim 3, in which the radial face portion of the first component is defined by a carrier for a seal face member associated with the first component.

11. The gas seal according to claim 2, in which deployment of the stand-still seal is controlled by electromagnetic mechanism.

12. The gas seal according to claim 3, in which deployment of the stand-still seal is controlled by electromagnetic mechanism.

13. The gas seal according to claim 4, in which deployment of the stand-still seal is controlled by electromagnetic mechanism.

14. The gas seal according to claim 5, in which deployment of the stand-still seal is controlled by electromagnetic mechanism.

15. The gas seal according to claim 6, in which deployment of the stand-still seal is controlled by electromagnetic mechanism.

16. The gas seal according to claim 7, in which deployment of the stand-still seal is controlled by electromagnetic mechanism.

17. The gas seal according to claim 8, in which deployment of the stand-still seal is controlled by electromagnetic mechanism.

18. The gas seal according to claim 9, in which deployment of the stand-still seal is controlled by electromagnetic mechanism.

19. The gas seal according to claim 10, in which deployment of the stand-still seal is controlled by electromagnetic mechanism.

* * * * *